United States Patent [19]

Haass

[11] 3,919,647

[45] Nov. 11, 1975

[54] CIRCUIT ARRANGEMENT FOR ADJUSTING THE PHASE STATE OF A TIMING SIGNAL

[75] Inventor: Adolf Haass, Munich, Germany

[73] Assignee: Siemens Aktiengesellschaft, Munich, Germany

[22] Filed: Oct. 29, 1974

[21] Appl. No.: 518,814

[30] Foreign Application Priority Data

Oct. 29, 1973 Germany ............................ 2354103

[52] U.S. Cl. .................................. 328/155; 307/262

[51] Int. Cl.[2] ............................................ H04B 1/02

[58] Field of Search ...................... 328/155; 307/262

[56] References Cited

UNITED STATES PATENTS

| | | | |
|---|---|---|---|
| 3,585,298 | 6/1971 | Liberman | 328/155 |
| 3,593,160 | 7/1971 | Moore | 328/155 |
| 3,851,101 | 11/1974 | En et al. | 328/155 |

*Primary Examiner*—John Kominski

*Attorney, Agent, or Firm*—Schuyler, Birch, Swindler, McKie & Beckett

[57] ABSTRACT

The invention relates to a circuit arrangement for adjusting the phase state of a timing signal. A divider signal is conducted via a first input of a frequency alteration stage to a frequency divider from the output of which the timing signal is emitted. A binary signal is also provided which for example can be employed to transmit data in the frame of a bit pattern from a transmitting station to a receiving station, the receiving station being synchronized using the timing signal. In dependence upon the phase states of the timing signal and the binary signal, as applied to a discriminator, a discriminator signal is obtained and is conducted to a second input of the frequency alteration stage. Also a third input of the frequency alteration stage is supplied with a signal which indicates whether and how many pulse edges of the divider signal are to be suppressed or pulse edges are to be added to the divider signal.

4 Claims, 7 Drawing Figures

CIRCUIT ARRANGEMENT FOR ADJUSTING THE PHASE STATE OF A TIMING SIGNAL

BACKGROUND OF THE INVENTION

When adjusting the phase state of a timing signal it is often desirable to adjust the phase state in accordance with a special predetermined adjustment characteristic. The object of the present invention is to provide a circuit arrangement by means of which any arbitrary adjustment curve can be set up in digital fashion and with a reduced equipment.

SUMMARY OF THE INVENTION

In accordance with the invention, a frequency divider is provided consisting of a plurality of divider stages, via the outputs of which signals are emitted. A divider signal is conducted via a first input of a frequency alteration stage to the frequency divider from the output of which the timing signal is emitted. A binary signal is also provided which for example can be employed to transmit data in the frame of a bit pattern from a transmitting station to a receiving station, the receiving station being synchronised using the timing signal. In dependence upon the phase states of the timing signal and the binary signal as applied to a discriminator, a discriminator signal is obtained and is conducted to a second input of the frequency alteration stage. Also a third input of the frequency alteration stage is supplied with a signal which indicates whether and how many pulse edges of the divider signal are to be suppressed or pulse edges are to be added to the divider signal. A coder is provided whose inputs are connected to the outputs of the divider stages and which assigns coding signals to the signals of the divider stages. Also a store is provided which stores the coding signals which occur at the time of one edge of the binary signal, and whose output is connected to the third input of the frequency alteration stage.

The circuit arrangement in accordance with the invention is characterized in that by the selection of the coder which is used, any desired adjustment characteristic may be set up in digital fashion with the desired accuracy.

In a preferred embodiment of the invention, the store comprises a counter whose count is dependent upon the number represented by the coding signals. The output of this counter is connected to the third input of the frequency alteration stage.

BRIEF DESCRIPTION OF THE DRAWINGS

Exemplary embodiments of the invention will be described in the following making reference to FIGS. 1 to 7, components appearing in more than one figure being provided with like references.

DESCRIPTION OF A PREFERRED EMBODIMENT

Figure 1:
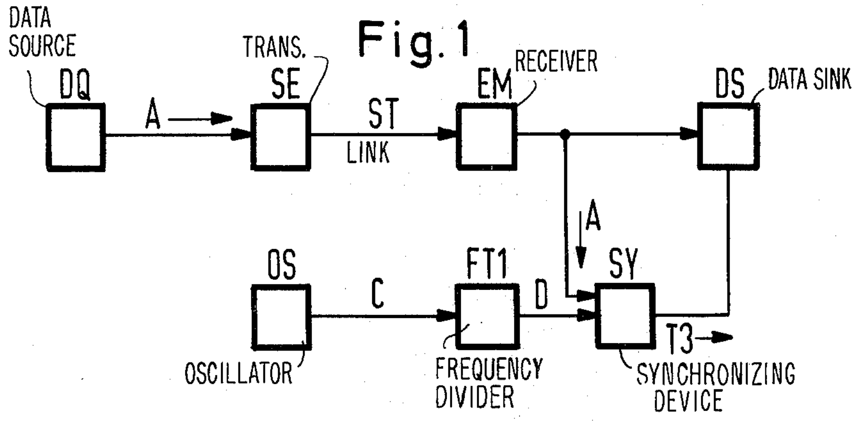
FIG. 1 shows a data transmission system.

The data transmission system represented in FIG. 1 consists of data source DQ, transmitter SE, transmission link ST, receiver EM, data sink DS, and oscillator OS, frequency divider FT1 and synchronizing device SY. The data source DQ emits signal A to the transmitter SE where a carrier is modulated in accordance with one of the known modulation processes and is transmitted via the transmission link ST to the receiver EM. Demodulation is carried out in the receiver EM so that the signal A is restored and conducted to the data sink DS. The data sink can for example be a data visual display device or a tape punching device. The signal A is applied to one input of synchronzing device SY.

Using the synchronizing device SY, a signal T3 is obtained with which the data sink DS is synchronized. As the phase state of the signal A generally changes, the phase state of the signal T3 must also be constantly readjusted. The signal T3 is obtained using frequency dividers in the synchronizing device. By means of a coding device, additional pulse flanks are added into a frequency divider signal or suppressed therein, so that the appropriate phase shift is produced in the signal T3.

Figure 2:
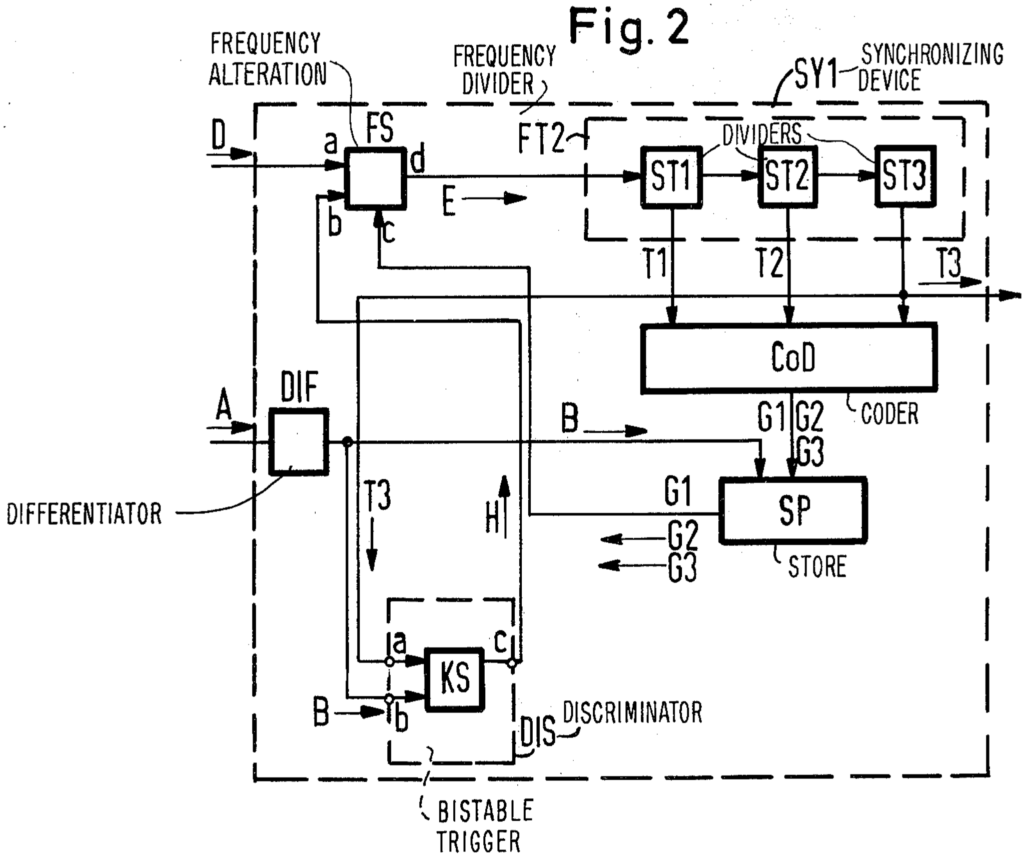
FIG. 2 shows a circuit diagram of a synchronising device usable in the circuit schematically illustrated in FIG. 1.

FIG. 2 shows an exemplary embodiment of the synchronizing device SY1, consisting of frequency alteration stage FS, divider FT2, coder COD, store SP, differentiator stage DIF and discriminator DIS.

The frequency alteration stage FS is supplied via the input a with the output of oscillator OS via the frequency divider FT1, whose output signal is illustrated in FIG. 1. Via the output d, the frequency alteration stage FS emits the signal E which differs at individual points from the signal D in respect of added or suppressed pulse flanks or edges. A discriminator signal H is supplied from discriminator DIS to input b of the frequency changing device FS. The signal H has values H=L or H=M to indicate whether pulse flanks are to be suppressed or added respectively. Via the input *c* is supplied a signal from a coding device which indicates the number of pulse flanks to be added or suppressed in producing timing signal T3.

The frequency divider FT2 consists of three divider stages ST1, ST2, ST3 whose outputs provide the signals T1, T2 and T3 and are fed to the coder COD. The mode of operation of the coder DOC can be seen from the following table:

TABLE 1

| T1 | T2 | T3 | G1 | G2 | G3 |
|---|---|---|---|---|---|
| M | M | M | 3 | 2 | 1 |
| L | M | M | 2 | 2 | 2 |
| M | L | M | 1 | 2 | 1 |
| L | L | M | 0 | 2 | 0 |
| M | M | L | 0 | 2 | 0 |
| L | M | L | 1 | 2 | 1 |
| M | L | L | 2 | 2 | 2 |
| L | L | L | 3 | 2 | 1 |

Figure 3:
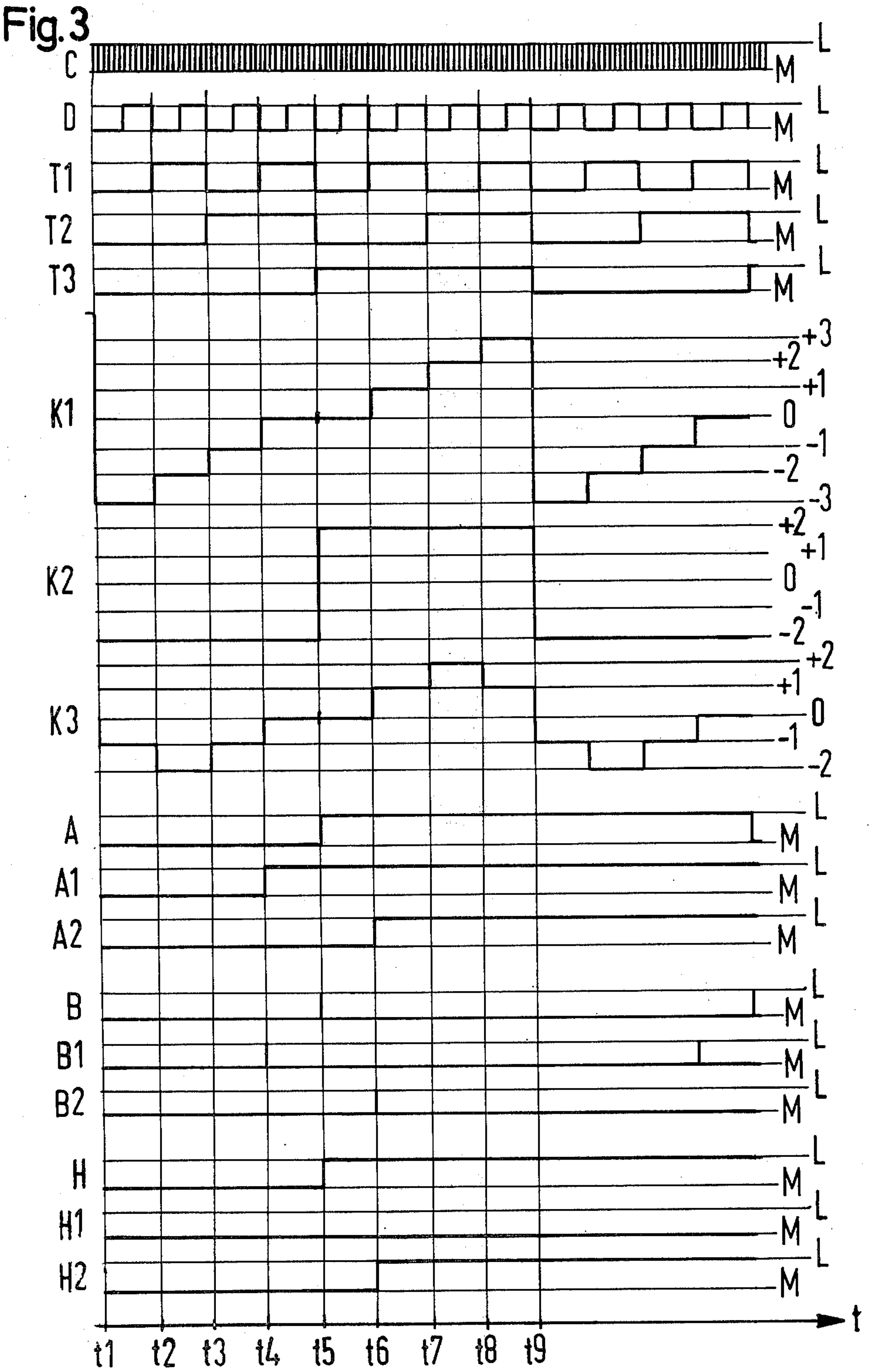
FIG. 3 shows diagrams relating to the mode of operation of the synchronising device represented in FIG. 2.

In this table, and in FIG. 3 the two binary values of binary signals are referenced as M and L. In dependence upon the binary values of the signals T1, T2 and T3 the coder emits one of the signals G1, or G2 or G3 to the store SP, where it is stored. The signals G1, G2, G3 characterize the number of pulse flanks or edges which are to be gated in or supressed in the frequency alteration stage FS. The signal G1 thus contains the information that for examle with T1=M, T2=M, T3=M, a total of three pulse edges flanks are to be gated in or suppressed. With T1=L, T2=L, T3=M, the signal G1 contains the information that zero pulse flanks and thus no pulse flanks are to be gated in or suppressed.

The discriminator DIS comprises a bistable trigger stage KS, whose stable states are referred to as L-state and M-state. During the L- and M-states respectively, the signals H=L or H=M are emitted from the output. A transition from the M state into the L state takes place with T3=L on the occurrence of a positive pulse edge of the signal B. A transition from the L state into the M state occurs with T3=M and on a positive pulse edge of the signal B.

In the following, the mode of operation of the synchronizing device SY1 represented in FIG. 2 will be explained making reference to the diagrams shown in FIG. 3. The top part of FIG. 3 illustrates the signal C which is emitted from the oscillator OS (shown in FIG. 1). By means of the frequency divider FT1 the signal D is obtained; the signals T1, T2 and T3 are emitted from the frequency divider FT2. By means of the differentiator stage DIF operating on the signal A, signal B is obtained which coincides with the flanks or edges of the signal A. As to signals G1, G2, G3, these binary signals are emitted from the coder COD to the store SP; the transfer of these binary signals occurs at the time of the signal B. The signals G1, G2, G3 can be conducted via one or more than one line from the coder to the store and from there to the frequency alteration stage FS (input c).

It will firstly be assumed that the coder COD emits the signal G1 in accordance with the Table. At the time t5, T1=M, T2=M, T3=L and thus, in accordance with the Table, G1=O. Thus the frequency alteration stage FS is supplied with the signal G1=O which indicates that no alterations are to be made in the signal D. If the signal A1 had arrived instead of the signal A, the signal B1 would have been produced and at time t4, with T1=M, Tw=L and T3=L, the signal G1=1 would have been fed to the frequency alteration stage FS. At the same time, with the aid of the discriminator DIS the discriminator signal H1=M would have been emitted so that in the frequency alteration stage FS one pulse flank would have been added to the signal D. If, instead of the signal A, the signal A2 arrives and the signal B2 is obtained, then, at the time t6 with T1=L, T2=M and T3=L, the signal G1=1 is stored and then fed to the frequency alteration stage FS. In this case, with the signal H2=L, one pulse flank is inserted into the signal D. In this way, in the case of the signal A1, the signal T3 is advanced, and in the case of the signal A2, the signal T3 is delayed. The adjustment of the phase state is completed in accordance with the approcimately saw-tooth-shaped curve K1. The amplitude stages of this curve are marked −3, −2, −1, 0, +1, +2, +3. The absolute value of these amplitude stages is dependent upon the signal G1, whereas the sign is dependent upon the signal H. If the signal A is present, the amounts of the signal G1 are negated from the time *t*1*t*5, to t5, whereas they are not negated from the time *t*5 onwards.

The curve K2 relates to the situation in which the coder COD emits the signal G2 to the store SP. With the signal H=M, the negative values −2 of the curve K2 are produced, and with the signal H=L, the positive values +2 of this curve occur. Thus a rectangular curve is formed.

The curve K3 is a rough approximation to a triangular curve in dependence upon the signal G3 which is now emitted by the coder COD to the store SP.

If a sufficient number of stages ST of the frequency divider FT2 are provided, the curves K1, K2, K3 can be represented to an arbitrary degree of accuracy. By means of the coder COD, in this way any desired curve can be represented with sufficient accuracy.

Figure 4:
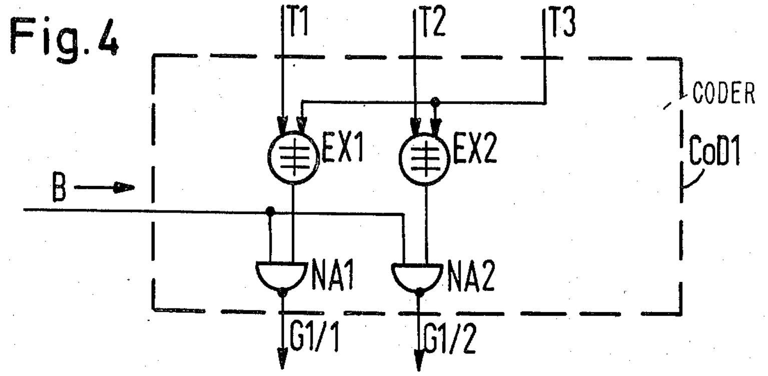
FIG. 4 shows a coder for a saw-tooth-shaped adjustment curve.

FIG. 4 shows the coder COD1, composed of the gates EX1, EX2, (EXCLUSIVE OR type) and NA1, NA2 which can be used to produce the adjustment curve K1 shown in FIG. 3. The two output lines are connected to the store SP. With the signals G1/1, G1/2, the number G1 of the Table is represented, the signals G1/1 and G1/2 being assigned the values one and two respectively.

Figure 5:
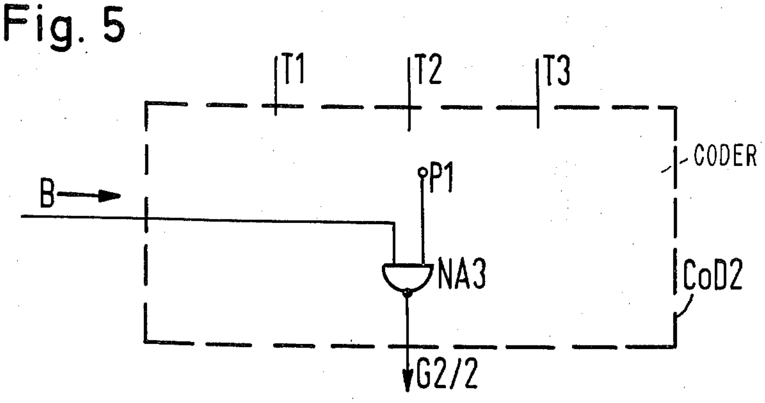
FIG. 5 shows a coder for a rectangular adjustment curve.

FIG. 5 shows the coder COD2 which is suitable to produce the curve K2. This coder consists only of the gate NA3. The signal G2/2 has a value of two. The circuit point P1 is connected to a potential corresponding to the binary value M.

Figure 6:
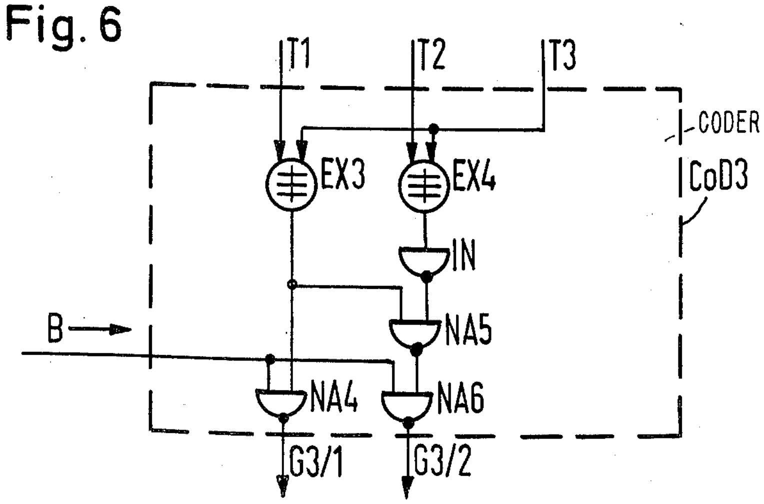
FIG. 6 shows a coder for a triangular adjustment curve and FIG. 7 shows circuit diagram of another synchronizing device usable in the circuit illustrated in FIG. 1.

FIG. 6 shows the coder COD3 which can be used to produce the curve K3. It consists of the gates EX3, EX4, IN, NA4, NA5, NA6. For the representation of the numbers of the signal G3, the signals G3/1 and G3/2 have the values of one and two respectively.

Figure 7:
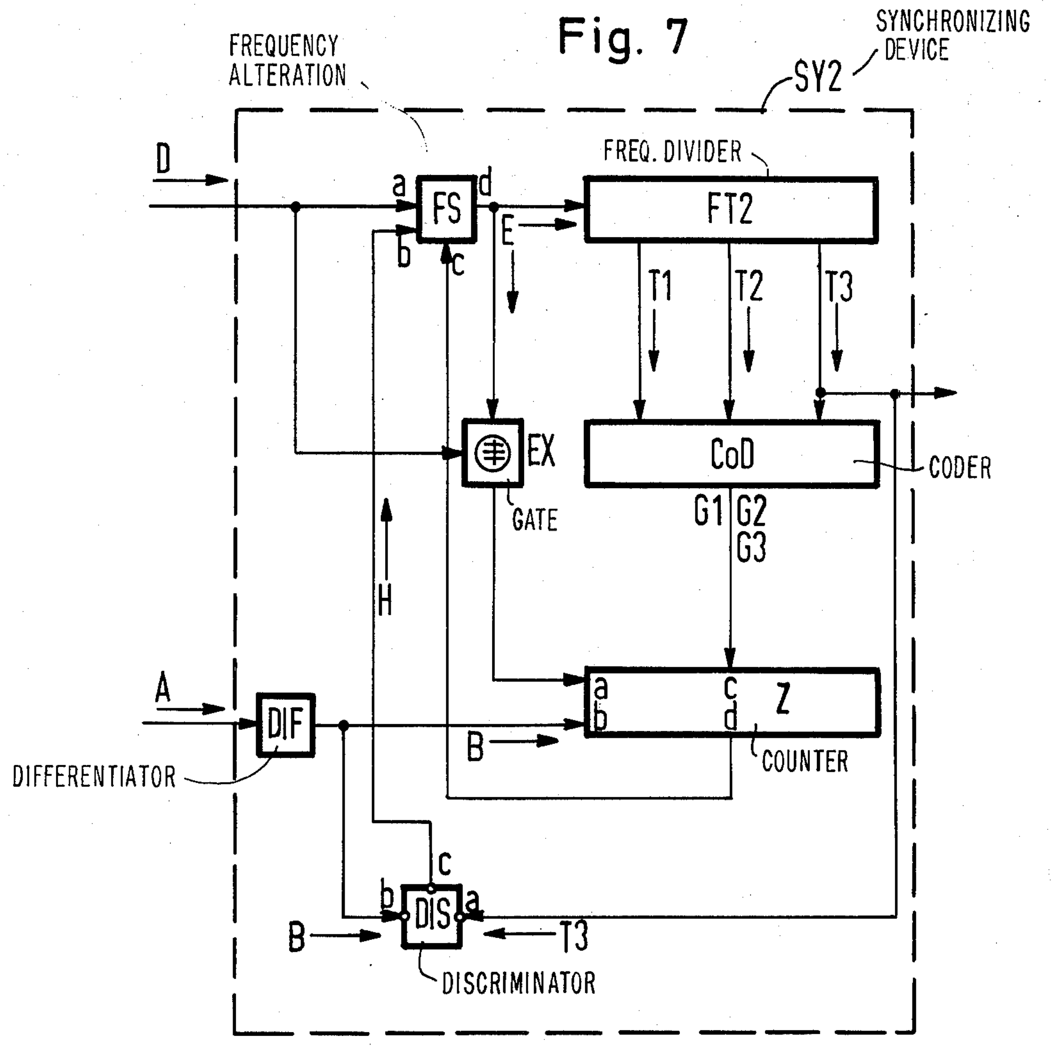

FIG. 7 shows an alternative embodiment of the synchronizing device namely synchronizing device SY2 which, besides the aforementioned components described in connection with the device SY1 of FIG. 2, contains the counter Z and the gate EX. In dependence upon the signal which is conducted to the counter via the input *c*, the count of this counter Z is set, the precise time being dependent upon a pulse which arrives via the input b.

When a pulse arrives via the input a, the count is reduced in each case by one unit. Via the output *d*, a signal is emitted which indicates whether the counter Z has reached the count 0 or not. Thus, in the frequency alteration stage FS either no change is made or one single change is made in respect of individual pulse flanks, in dependence upon this signal supplied via the input c. The gate EX can for example be an EXCLUSIVE-OR gate which emits a pulse when the signals D and E change. Thus the frequency change stage FS serves to suppress or add pulse flanks or edges for a time until the counter Z reaches the count of 0.

Only preferred embodiments of this invention are described herein, modification may occur to others which lie within the scope of this invention which is intended to be defined only by the appended claims.

I claim:

1. A circuit for adjusting the phase state of a timing signal comprising a frequency changing device receiving the signal to be adjusted a frequency divider whose input is coupled to the output of said frequency changing device and whose output comprises the phase adjusted timing signal, a discriminator responsive to an output of said frequency divider and a binary signal for providing an input signal to said frequency changing device, a coder storing an adjustment characteristic to be applied to the received signal to be adjusted, said frequency divider comprising a plurality of stages, the output of each stage being coupled to the input of said coder, said coder assigning code values to the signals received from each output of said frequency divider on the basis of said adjustment characteristic, and means for coupling the coded output signals of said coder to a third input of said frequency changing device.

2. The circuit as claimed in claim 1 wherein said coupling means are energized to fix values for said coded signals concurrently with an edge of said binary signal provided to said discriminator.

3. The circuit as claimed in claim 2 wherein said coupling means comprise a store for storing said coded values, said values being transferred to said store concurrently with the existence of said edge of said binary signal.

4. A circuit arrangement as claimed in claim 1, characterized in that said store comprises a counter whose count is dependent upon a number represented by the coder output signals, the output of the counter being connected to the third input of the frequency changing stage device, and a gate being connected between the output of said frequency changing device and the input of said counter, another input of said gate receiving said signal to be adjusted applied to said changing device, said gate emitting an alteration signal which indicates each alteration in the signal applied to said frequency changing device, the alteration gate signal being conducted to the counter to cause the counter to count backwards whenever a pulse edge is added to or suppressed from the signal to be adjusted.

* * * * *